United States Patent [19]

Wolf

[11] Patent Number: 4,748,960
[45] Date of Patent: Jun. 7, 1988

[54] FUEL SYSTEM

[76] Inventor: Gilbert Wolf, 7412 Laramie, Skokie, Ill. 60077

[21] Appl. No.: 851,448

[22] Filed: Apr. 14, 1986

[51] Int. Cl.⁴ .................. F02M 31/10; F02M 31/14
[52] U.S. Cl. .................. 123/549; 123/557; 219/205
[58] Field of Search .......... 123/549, 552, 557; 219/205, 206, 207

[56] References Cited

U.S. PATENT DOCUMENTS

| | | | |
|---|---|---|---|
| 2,669,299 | 2/1954 | Roach | 158/36 |
| 2,902,158 | 9/1959 | Muller | 210/184 |
| 4,044,742 | 8/1977 | Linder | 123/122 |
| 4,180,036 | 12/1979 | Wolf | 123/122 |
| 4,237,850 | 12/1980 | Connor et al. | 123/557 |
| 4,372,261 | 2/1983 | Sarto | 123/549 X |
| 4,372,279 | 2/1983 | Parks | 123/557 |
| 4,395,996 | 8/1983 | Davis | 123/557 |
| 4,397,287 | 8/1983 | Pierard | 123/557 |
| 4,404,949 | 9/1983 | Bell | 123/557 |
| 4,473,054 | 9/1984 | Marcoux et al. | 123/557 |
| 4,477,715 | 10/1984 | Bell et al. | 123/557 X |
| 4,489,708 | 12/1984 | Yamamoto et al. | 123/557 X |
| 4,512,324 | 4/1985 | Neary | 123/557 |
| 4,516,556 | 5/1985 | Meyer | 123/552 X |

OTHER PUBLICATIONS

"Heater", Stanadyne Diesel Systems, No. 99243, Rev. 1/86.

Primary Examiner—Tony M. Argenbright
Attorney, Agent, or Firm—Leydig, Voit & Mayer

[57] ABSTRACT

The disclosure describes a heating apparatus for a fuel system having a container which stores the fuel. The heating apparatus comprises a fuel pickup conduit having an inlet, an outlet, and a first portion insertable into the container, the first portion terminating with the inlet. The heating apparatus also comprises a heat exchanging assembly insertable into the container for passing heatable fluid adjacent the first portion of the fuel pickup conduit. Further, the heating apparatus additionally comprises a heating unit including an electrical heating element mounted proximate the fuel pickup conduit and further including a connector for supplying electrical energy to the heating element.

13 Claims, 1 Drawing Sheet

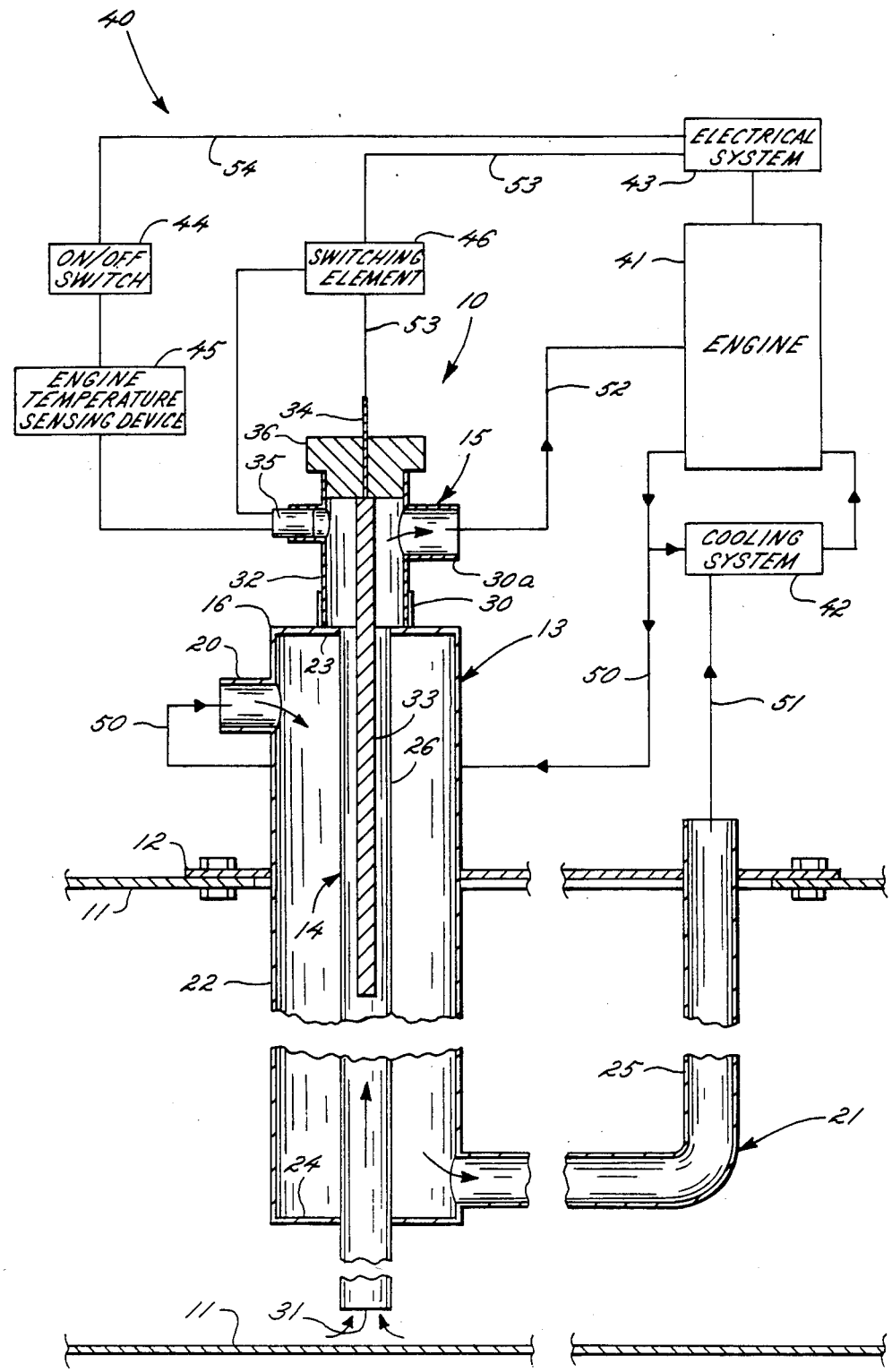

FUEL SYSTEM

TECHNICAL FIELD

The present invention relates to fuel systems and, in particular, to apparatus for heating fuels.

BACKGROUND OF THE INVENTION

Whenever the fuel tank or the fuel line of an engine is exposed to cold weather, the fuel or certain impurities or additives contained in the fuel may gel or "wax", i.e., they become excessively thick. For example, the diesel fuel in the fuel tanks or fuel lines of diesel trucks may wax if the truck is parked or driven in extremely cold weather. Since waxing can interfere with the proper flow of fuel to the engine, it frequently results in poor engine performance. Severe waxing may even block the flow of fuel entirely, killing the engine.

Waxing may be eliminated by heating the fuel. However, while many devices for heating fuel to eliminate waxing have been proposed, they nonetheless have several undesirable characteristics. For example, one device utilizes a tube which loops through the fuel tank. Hot exhaust gas or coolant that has been heated by the engine is channeled through the tube, heating the fuel. However, it frequently requires a considerable period of time for the coolant or exhaust gas to become hot and for the hot coolant or exhaust gas to sufficiently heat the fuel in the tank to eliminate any waxing, especially for large fuel tanks. Consequently, the engine may nonetheless perform poorly for a long period of time.

Further, while much of the fuel is eventually heated by such a device, localized cold spots may still develop. For example, in extremely cold weather, the fuel may continue to wax along the bottom and sides of large metal fuel tanks. Since the inlet of the fuel line is typically located near the bottom of the fuel tank, such localized waxing along the bottom of the tank may interfere with the proper flow of fuel through the fuel line.

SUMMARY OF THE INVENTION

The present invention provides a fuel heating apparatus for a fuel system with a container such as a tank for storing the fuel. The heating apparatus according to the present invention comprises a fuel pickup conduit and a heat exchanger for heating both the fuel in the container and the fuel in the pickup conduit. The fuel pickup conduit has a fuel inlet, which may be inserted into the container, and a fuel outlet. The heat exchanger includes a heat conductive portion, an inlet for admitting a heatable fluid, such as the engine coolant, into the heat conductive portion, and an outlet for discharging the heatable fluid from the heat conductive portion. The heat conductive portion, which surrounds a portion of the fuel pickup conduit, may be inserted into the container in contact with the fuel in the container. With the fuel heating apparatus provided by the present invention, the heat exchanger heats not only the fuel in the tank but also the fuel being withdrawn through the fuel pickup conduit. Consequently, any localized waxing that may develop in the tank is eliminated as the fuel is further heated when it is withdrawn through the fuel pickup conduit.

The present invention provides a further fuel heating apparatus for a fuel system with a container such as a tank for storing the fuel. According to the present invention, this further heating apparatus comprises a casing and a means for mounting the casing to the container. The casing includes a cylindrical, heat conductive, external shell which may be inserted into the container in contact with the fuel. The casing also includes an inlet for admitting a heatable fluid into the casing and an outlet for discharging the heatable fluid from the casing. This further heating apparatus also comprises a fuel pickup conduit and an electrical heating unit. The fuel pickup conduit is supported by the casing and has a fuel inlet and a fuel outlet. A portion of the fuel pickup conduit extends generally coaxially through the shell of the casing and terminates with the fuel inlet. The electrical heating unit includes a heating element mounted within the fuel pickup conduit, a connector for supplying electrical energy to the heating element, and a fuel temperature sensor for sensing fuel temperature in the fuel pickup conduit. With the further fuel heating apparatus provided by the present invention, there is no considerable period of time required to heat the fuel in the container to eliminate waxing. As the fuel is withdrawn from the tank through the fuel pickup conduit, the fuel may be heated immediately by the electric heating element.

The present invention additionally provides a fuel system for an engine which has an electrical system for providing electrical energy. According to the invention, the fuel system comprises a container for storing the fuel and an arrangement for supplying the fuel from the container to the engine. The fuel supplying arrangement includes a fuel pickup conduit having a first portion which extends into the container and terminates with a fuel inlet for withdrawing fuel from the container. The fuel system also comprises a heat exchanger for heating both the fuel in the container and the fuel in the pickup conduit and an electrical heating unit coupled to the electrical system of the engine. The heat exchanger includes a heat conductive casing, an inlet for admitting a heatable fluid into the heat conductive casing, and an outlet for discharging the heatable fluid from the heat conductive casing. The heat conductive casing may be inserted into the container in contact with the fuel in the container and surrounding the portion of the fuel pickup conduit. The electrical heating unit includes a heating element mounted near the portion of the fuel pickup conduit and a connector for supplying electrical energy to a heating element.

BRIEF DESCRIPTION OF THE DRAWING

The FIGURE is a block diagram of a fuel system which incorporates a fuel heating apparatus embodying the present invention, the fuel heating apparatus being shown in a sectional elevation view.

DETAILED DESCRIPTION OF THE PREFERRED EMBODIMENT

As shown in the FIGURE, an exemplary fuel heating apparatus 10 embodying the present invention is mounted to a fuel tank 11 by means of any suitable mounting plate 12. For example, a mounting plate 12 fabricated from a metal such as stainless steel may be bolted to the fuel tank 11 with an appropriate sealant between them. The exemplary fuel heating apparatus 10 is then attached to the mounting plate 12 in any suitable manner, including by welding.

The exemplary fuel heating apparatus 10 generally comprises a heat exchanger assembly 13, a fuel pickup conduit 14, and a heating unit 15. The heat exchanger assembly 13 may be fabricated from any suitable impervious material. However, it is preferably fashioned from stainless steel, which both resists corrosion and conducts heat well.

The heat exchanger assembly 13 may be variously configured without departing from the scope of the invention. In the exemplary fuel heating apparatus 10, the heat exchanger assembly 13 includes a casing 16 with a fluid inlet 20 and a fluid outlet 21. The casing 16 has a cylindrical shell 22 with first and second closed ends 23, 24. The cylindrical shell 22 is welded to the mounting plate 12 with an external portion of the casing 16 extending beyond the fuel tank 11 and an internal portion of the casing 16 extending into the fuel tank 11. The fluid inlet 20 communicates with the exterior portion of the casing 16 and may comprise any suitable fitting.

The fluid outlet 21 may also be configured to communicate with the exterior portion of the casing 16. However, in accordance with one aspect of the invention, the fluid outlet 21 of the exemplary fuel heating apparatus 10 comprises an outlet tube 25 which communicates with the interior portion of the casing 16, extending away from the casing 16 to the exterior of the fuel tank 11. One end of the outlet tube 25 is preferably attached to the interior portion of the casing 16 near the second closed end 24. The other end of the outlet tube is preferably attached to the mounting plate 12 and may also comprise any suitable fitting.

In accordance with another aspect of the invention, the fuel pickup conduit 14 is positioned adjacent the heat exchanger assembly 13. Again, while the fuel pickup conduit 14 may be fabricated from any suitably impervious material, it is preferably fashioned from stainless steel, which both resists corrosion and conducts heat well.

The fuel pickup conduit 14 comprises a pickup tube 26 and a fuel outlet 30. The pickup tube 26 extends from an aperture in the first closed end 23, coaxially along the shell 22, through an aperture in the second closed end 24, and preferably to the bottom of the fuel tank 11. To support the pickup tube 26 and prevent any exchange of fluid between the fuel pickup conduit 14 and the heat exchanger assembly 13, the pickup tube 26 is preferably welded to the first and second closed ends 23, 24. The pickup tube 26 terminates at one end with the fuel outlet 30, which may comprise any suitable fitting, and at the other end in a fuel inlet 31 which may include a porous filter (not shown) disposed in the pickup tube 26.

The heating unit 15 may also be variously configured without departing from the scope of the invention. In the exemplary fuel heating apparatus 10, the heating unit 15 includes a sleeve 32, an electric heating element 33, an electrical connector 34, and a temperature sensing device 35. The sleeve 32 may be threaded to the fuel outlet 30 of the fuel pickup conduit 14, effectively extending the fuel pickup conduit to a second fuel outlet 30a. This second fuel outlet 30a may also comprise any suitable fitting and is preferably attached to the side of the sleeve 32.

The heating element 33 may comprise any suitable device for heating the fuel in the fuel pickup conduit 14, including for example a self-regulating thermal tape. Preferably, the electric heating element 33 comprises any of several commonly available immersible elements and extends within the fuel pickup conduit 14, terminating within the interior of the fuel tank 11. The heating element 33 is attached to a threaded connector 36 which is threaded to the sleeve 32 to facilitate replacement of the heating element 33. The electrical connector 34 extends through the threaded connector 36 to supply electrical energy to the heating element 33. The temperature sensing device 35, which may for example comprise a thermostatic element, is also threaded to the sleeve 32 near the fuel outlet 30a to monitor the temperature of the fuel.

As further shown in the FIGURE, an exemplary fuel system 40 incorporating the exemplary fuel heating apparatus in accordance with the invention may be used with an internal combustion engine. For example, the exemplary fuel system 40 may be used with an ordinary diesel engine 41 having a cooling system 42 and an electrical system 43. The cooling system 42 typically includes a radiator and associated pumps and fluid lines for circulating a heatable fluid, such as a liquid or gaseous coolant, through the engine where the fluid is heated and then back to the radiator. The electrical system 43 typically includes a device for generating electrical energy, a device for storing electrical energy, an ignition switch, and associated circuitry.

In addition to the exemplary fuel heating apparatus 10 in the fuel tank 11, the exemplary fuel system 40 may further include an on/off switch 44, a device 45 for sensing the temperature of the engine 41, and a switching circuit 46 for controlling the supply of electrical energy to the heating unit 15. The switching circuit 46 may include any necessary solenoids and relays to interrupt the supply of electrical energy and may be physically separate from the exemplary fuel heating apparatus 10, as shown. Alternatively, if the currents supplied to the electric heating element 33 are sufficiently small, the switching circuit 46 may be fashioned from electronic components and incorporated in the heating unit 15 of the exemplary fuel heating apparatus 10.

In the preferred mode of operation during cold weather, the heatable fluid circulated by the cooling system 42 is directed by a feed line 50 from a point downstream from the engine 41 to the inlet 20 of the heat exchanger assembly 13. The heatable fluid is then returned via a return line 51 from the outlet 21 of the heat exchanger assembly 13 to the cooling system 42. A valve (not shown) may be inserted in the feed or return lines 50, 51 to control the flow of heatable fluid to the heat exchanger assembly 13. Further, an auxiliary heater (not shown) may be inserted in the feed line 50 to more quickly heat the heatable fluid flowing into the heat exchanger assembly 13.

As the heatable fluid circulates through the heat exchanger assembly 13, fuel is withdrawn from the tank 11 and directed through the fuel pickup conduit 14 along the fuel line 52 to the engine 41 by a fuel pump (not shown). Simultaneously, electrical energy may be supplied to the electric heating element 33 along a supply line 53 from the electrical system 43 through the switching circuit 46 to the electrical connector 34. Further, a control signal may be supplied along a control line from the electrical system 43 through the on/off switch 44, the engine temperature sensing device 45, and the fuel temperature sensing device 35 of the heating unit 15 to the switching circuit 46.

With the heating element 33 disposed within the fuel pickup conduit 14, the exemplary fuel heating apparatus 10 ensures that fuel withdrawn from the tank 11 is heated immediately, even if the engine 41 and, therefore, the heatable fluid are still cold. The fuel temperature sensing device 35 monitors the temperature of the fuel near the fuel outlet 30a of the fuel pickup conduit 14. If the fuel becomes too warm, the fuel temperature sensing device 35 can signal the switching circuit 46 to interrupt the supply of electrical energy to the heating element 33. Further, once the engine 41 and, therefore, the heatable fluid become hot, the electric heating element 33 becomes superfluous because both the fuel in the tank 11 and the fuel in the fuel pickup conduit 14 can be heated by the heat exchanger assembly 13. Upon sensing the appropriate engine temperature, the engine temperature sensing device 45 can signal the switching circuit 46 to interrupt the supply of electrical energy to the heating element 33. Of course, when the engine is operated in warm weather, the on/off switch 44 should be turned off, which also signals the switching circuit 46 to interrupt the supply of electrical energy to the heating element 33.

With the heat exchanger assembly 13 disposed within the tank 11, the exemplary fuel heating apparatus 10 ensures that virtually all of the fuel in the tank 11 will be heated. The extension of the outlet tube 25 away from the casing 16 and out into the fuel greatly facilitates the transfer of heat from the heatable fluid to the fuel. Further, with the heat exchanger assembly 13 disposed adjacent the fuel pickup conduit 14, the exemplary fuel heating apparatus 10 also ensures that only warm fuel is supplied through the fuel line 52 to the engine 41. Consequently, any waxing which may occur due to localized cold spots in the tank 11, e.g., along the bottom of the tank 11, will be eliminated as the fuel travels up the fuel pickup conduit 14 through the heat exchange assembly 13.

Although the invention has been described in terms of a single exemplary embodiment, it is not limited to that embodiment. Alternative embodiments and modifications which would still be encompassed by the invention may be made by those skilled in the art, particularly in light of the foregoing teachings. For example, a fuel system embodying the present invention may utilize exhaust gas from the engine rather than a heatable fluid from the cooling system. The heatable fluid is preferred, however, since it is less corrosive. Further, the fuel system may be used with many types of engines other than diesel engines and may be used with a suitable coolant to cool fuel stored in fuel tanks during hot weather. Therefore, the following claims are intended to cover any alternative embodiments, modifications, or equivalents which may be included within the spirit and scope of the invention.

I claim:

1. A heating apparatus for a fuel system having a container which stores the fuel, the heating apparatus comprising:
    a fuel pickup conduit having an inlet and an outlet, the inlet being insertable into the container; and
    heat exchanger means for heating both the fuel in the container and the fuel in the pickup conduit, the heat exchanger means including a heat conductive portion insertable into the container in contact with the fuel in the container, inlet means for admitting a heatable fluid into the heat conductive portion, outlet means for discharging the heatable fluid from the heat conductive portion, the heat conductive portion of the heat exchanger means surrounding a first portion of the fuel pickup conduit between the inlet and the outlet.

2. The heating apparatus of claim 1 wherein the heat conductive portion of the heat exchanger means includes a generally cylindrical casing mountable to and insertable into the container, said fuel pickup conduit being supported by the casing with the first portion of the fuel pickup conduit extending generally coaxially through the casing.

3. The heating apparatus of claim 2 wherein the outlet means includes an outlet tube extending away from the casing in contact with the fuel in the container and having first and second ends, the first end communicating with the casing within the container and the second end positionable external to the container.

4. The heating apparatus of claim 1 further comprising a heating unit including an electrical heating element mounted proximate the fluid pickup conduit and further including connector means for supplying electrical energy to the heating element.

5. The heating apparatus of claim 4 wherein the heating unit includes means for mounting the heating element within the fuel pickup conduit.

6. The heating apparatus of claim 5 wherein the heating unit includes means for sensing fuel temperature within the fuel pickup conduit.

7. The heating apparatus of claim 6 wherein the heating unit further includes switch means coupled to the temperature sensing means and the connector means for interrupting the supply of electrical energy to the heating element in response to fuel temperature.

8. A heating apparatus for a fuel system having a container for storing the fuel, said heating apparatus comprising:
    a casing including a cylindrical, heat conductive, external shell insertable into the container in contact with the fuel, inlet means for admitting a heatable fluid into the casing, and outlet means for discharging the heatable fluid from the casing;
    means for mounting the casing to the container;
    a fuel pickup conduit supported by the casing and including an inlet, an outlet, and a first portion extending generally coaxially through the shell of the casing and terminating with the inlet; and
    an electrical heating unit including a heating element mounted within the fuel pickup conduit, connector means for supplying electrical energy to the heating element, and means for sensing fuel temperature in the fuel pickup conduit.

9. The heating apparatus of claim 8 wherein the outlet means of the casing includes an outlet tube extending away from the shell and having first and second ends, the first end communicating with the shell and the second end positionable external to the container and wherein the casing mounting means includes means for mounting the outlet tube to the container.

10. The heating apparatus of claim 9 wherein the casing mounting means comprises a mounting plate attachable to the container, the casing and the outlet tube being attached to the mounting plate.

11. For an engine having an electrical system for providing electrical energy, a fuel system comprising:
    a container for storing the fuel;
    means for supplying the fuel from the container to the engine, said fuel supplying means including a fuel pickup conduit having a first portion extending into the container and terminating with an inlet for withdrawing fuel from the container;
    heat exchanger means for heating both the fuel in the container and the fuel in the pickup conduit, the heat exchanger means including a heat conductive casing surrounding the first portion of the fuel pickup conduit and inserted into the container in contact with the fuel in the container, inlet means for admitting a heatable fluid into the heat conductive casing, and outlet means for discharging the heatable fluid from the heat conductive casing; and an electrical heating unit coupled to the electrical system of the engine and including a heating element mounted near the first portion of the fuel pickup conduit and connector means for supplying electrical energy to the heating element.

12. The fuel system of claim 11 wherein the engine further includes a cooling system for supplying a heatable fluid to the engine and wherein the heat exchanger means includes means for coupling the inlet means and outlet means to the cooling system, said inlet means being coupled to the cooling system downstream from the engine.

13. The fuel system of claim 12 wherein the heating unit further includes switch means coupled to the connector means for interrupting the supply of electrical energy to the heating element in response to engine temperature.

* * * * *

REEXAMINATION CERTIFICATE (1759th)
United States Patent [19]
Wolf

[11] B1 4,748,960
[45] Certificate Issued Jul. 28, 1992

[54] FUEL SYSTEM

[76] Inventor: Gilbert Wolf, 7412 Laramie, Skokie, Ill. 60077

Reexamination Request:
No. 90/002,413, Aug. 21, 1991

Reexamination Certificate for:
Patent No.: 4,748,960
Issued: Jun. 7, 1988
Appl. No.: 851,448
Filed: Apr. 14, 1986

[51] Int. Cl.$^5$ ............... F02M 31/10; F02M 31/14
[52] U.S. Cl. .................. 123/549; 123/557; 219/205
[58] Field of Search ............ 123/552, 549, 557; 219/205, 206, 207

[56] References Cited
U.S. PATENT DOCUMENTS

| | | | |
|---|---|---|---|
| 2,641,451 | 6/1953 | Kaiser | 165/142 |
| 2,669,299 | 2/1954 | Roach | 137/341 |
| 2,902,158 | 9/1959 | Muller | 210/184 |
| 4,044,742 | 8/1977 | Linder | 123/549 |
| 4,180,036 | 12/1979 | Wolf | 123/557 |
| 4,237,850 | 12/1980 | Connor et al. | 123/557 |
| 4,372,261 | 2/1983 | Sarto | 123/549 |
| 4,372,279 | 2/1983 | Parks | 123/557 |
| 4,395,996 | 8/1983 | Davis | 123/557 |
| 4,397,287 | 8/1983 | Pierard | 123/557 |
| 4,404,949 | 9/1983 | Bell | 123/557 |
| 4,473,054 | 9/1984 | Marcoux et al. | 123/557 |
| 4,477,715 | 10/1984 | Bell et al. | 123/549 |
| 4,489,708 | 12/1984 | Yamamoto et al. | 123/557 |
| 4,512,324 | 4/1985 | Neary | 123/557 |
| 4,516,556 | 5/1985 | Meyer | 123/557 |
| 4,553,697 | 11/1985 | Nothen et al. | 123/549 |
| 4,748,960 | 6/1988 | Wolf | 123/549 |

*Primary Examiner*—T. M. Argenbright

[57] ABSTRACT

The disclosure describes a heating apparatus for a fuel system having a container which stores the fuel. The heating apparatus comprises a fuel pickup conduit having an inlet, an outlet, and a first portion insertable into the container, the first portion terminating with the inlet. The heating apparatus also comprises a heat exchanging assembly insertable into the container for passing heatable fluid adjacent the first portion of the fuel pickup conduit. Further, the heating apparatus additionally comprises a heating unit including an electrical heating element mounted proximate the fuel pickup conduit and further including a connector for supplying electrical energy to the heating element.

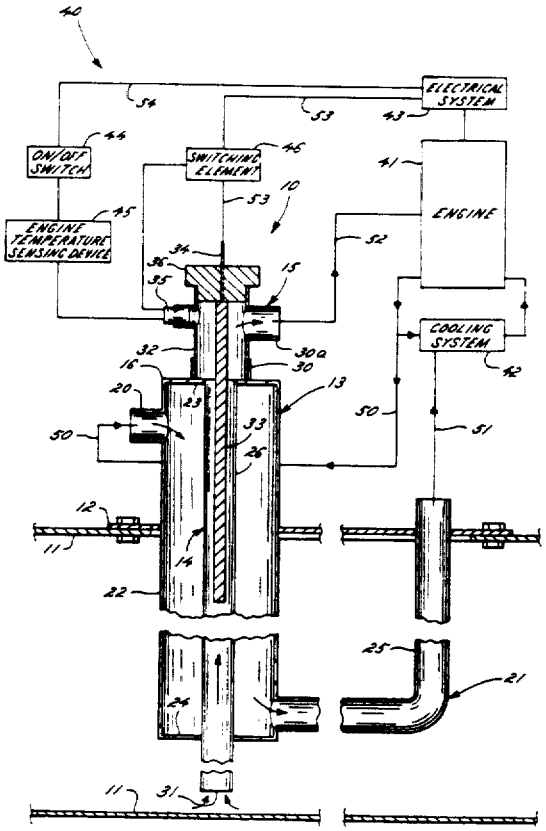

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8-13 is confirmed.

Claim 1 is determined to be patentable as amended.

Claims 2-7, dependent on an amended claim, are determined to be patentable.

1. A heating apparatus for a fuel system having a container which stores the fuel, the heating apparatus comprising:

a fuel pickup conduit having an inlet and an outlet, the inlet being insertable into the container; and heat exchanger means for *directly* heating both the fuel in the container and the fuel in the pickup conduit, the heat exchanger means including a heat conductive portion insertable into the container in contact with the fuel in the container, inlet means for admitting a heatable fluid into the heat conductive portion, outlet means for discharging the heatable fluid from the heat conductive portion, the heat conductive portion of the heat exchanger means surrounding a first portion of the fuel pickup conduit between the inlet and the outlet.

* * * * *